(12) United States Patent
Fourcand

(10) Patent No.: US 8,416,770 B2
(45) Date of Patent: Apr. 9, 2013

(54) UNIVERSAL SERVICE TRANSPORT TRANSITIONAL ENCODING

(75) Inventor: Serge Francois Fourcand, Fairview, TX (US)

(73) Assignee: Futurewei Technologies, Inc., Plano, TX (US)

( * ) Notice: Subject to any disclaimer, the term of this patent is extended or adjusted under 35 U.S.C. 154(b) by 306 days.

(21) Appl. No.: 12/836,638

(22) Filed: Jul. 15, 2010

(65) Prior Publication Data
US 2011/0013619 A1    Jan. 20, 2011

Related U.S. Application Data

(60) Provisional application No. 61/226,972, filed on Jul. 20, 2009.

(51) Int. Cl.
*H04L 12/66* (2006.01)

(52) U.S. Cl.
USPC ............ 370/352; 370/342; 370/242; 370/278

(58) Field of Classification Search .................. 370/352, 370/342, 242, 278, 503
See application file for complete search history.

(56) References Cited

U.S. PATENT DOCUMENTS

| | | | |
|---|---|---|---|
| 6,646,983 B1 | 11/2003 | Roy et al. | |
| 6,925,096 B2 * | 8/2005 | Haartsen | 370/473 |
| 6,999,450 B2 | 2/2006 | Rumer | |
| 2002/0159438 A1 | 10/2002 | Rumer | |
| 2007/0147246 A1 * | 6/2007 | Hurley et al. | 370/232 |
| 2008/0075124 A1 * | 3/2008 | Fourcand | 370/503 |
| 2008/0259807 A1 * | 10/2008 | Yan | 370/242 |
| 2009/0180478 A1 | 7/2009 | Yu et al. | |

FOREIGN PATENT DOCUMENTS

| | | |
|---|---|---|
| CN | 1859382 A | 11/2006 |
| CN | 101212424 A | 7/2008 |
| CN | 101299649 A | 11/2008 |
| WO | 0169834 A1 | 9/2001 |
| WO | WO 0169834 A1 * | 9/2001 |
| WO | 2008092389 A1 | 8/2008 |

OTHER PUBLICATIONS

Foreign Communication From a Related Counterpart Application, European Application No. 10801961.3, Extended European Search Report dated Feb. 6, 2012, 8 pages.

(Continued)

*Primary Examiner* — Chandrahas Patel
*Assistant Examiner* — Parth Patel
(74) *Attorney, Agent, or Firm* — Conley Rose, P.C.; Grant Rodolph; Rayhao Chung

(57) ABSTRACT

An apparatus comprising a switch fabric coupled to a plurality of interfaces and configured to switch a plurality of universal service transport (UST) multiplexing (USTM) data streams between the interfaces, wherein the USTM data streams comprise packet-switched traffic, circuit-switched traffic, and transitional signaling that indicates a change of state between the packet-switched traffic and the circuit-switched traffic, wherein the transitional signaling does not indicate the state in every octet of the USTM data streams. Also disclosed is a network component comprising at least one processor coupled to a memory and configured to receive a data that corresponds to a flow, identify the flow using a flow map, determine whether there is a change in a state of the flow, send transitional signaling on a USTM data stream that indicates the state of the flow if the state of flow has changed, and send the data on the USTM data stream.

18 Claims, 12 Drawing Sheets

OTHER PUBLICATIONS

Foreign Communication From a Related Counterpart Application, PCT Application No. PCT/CN2010/075329, International Search Report dated Oct. 28, 2010, 3 pages.

Foreign Communication From a Related Counterpart Application, PCT Application No. PCT/CN2010/075329, Written Opinion dated Oct. 28, 2010, 6 pages.

* cited by examiner

FIG. 8

| Code Group | Octet Value | Octet Bits HGF EDCBA | Current RD − abcdei fghj | Current RD + abcdei fghj | IEEE | | | | H-ETH | | | | H-SE | | | H-TDM | | | H-JUMBO | | |
|---|---|---|---|---|---|---|---|---|---|---|---|---|---|---|---|---|---|---|---|---|---|
| | | | | | Config | Idle | Encap | Diag | Config | Idle | Encap | Diag | Config | Idle | Encap | Config | Idle | Encap | Config | Idle | Encap |
| K28.0 | 1C | 000 11100 | 001111 0100 | 110000 1011 | | | | | | | | | | | | | | | | | [✓] |
| K28.1 | 3C | 001 11100 | 001111 1001 | 110000 0110 | | | | | | | | | | | | | | [✓] | | | |
| K28.2 | 5C | 010 11100 | 001111 0101 | 110000 1010 | | | | | | | | | | | | | | [✓] | | | |
| K28.3 | 7C | 011 11100 | 001111 0011 | 110000 1100 | | | | | | | | | | | | | | [✓] | | | |
| K28.4 | 9C | 100 11100 | 001111 0010 | 110000 1101 | | | | | | | | | | | | | | [✓] | | | |
| K28.5 | BC | 101 11100 | 001111 1010 | 110000 0101 | ✓ | ✓ | | | ✓ | ✓ | | | ✓ | ✓ | | ✓ | | [✓] | ✓ | ✓ | |
| K28.6 | DC | 110 11100 | 001111 0110 | 110000 1001 | | | | ✓ | | | | ✓ | | | | | | | | | |
| K28.7 | FC | 111 11100 | 001111 1000 | 110000 0111 | | | ✓ | | | | ✓ | | | | ✓ | | | ✓ | | | |
| K23.7 | F7 | 111 10111 | 111010 1000 | 000101 0111 | | | ✓ | | | | ✓ | | | | ✓ | | | | | | |
| K27.7 | FB | 111 11011 | 110110 1000 | 001001 0111 | | | ✓ | | | | ✓ | | | | ✓ | | | | | | ✓ |
| K29.7 | FD | 111 11101 | 101110 1000 | 010001 0111 | | | ✓ | | | | ✓ | | | | ✓ | | | [✓] | | | ✓ |
| K30.7 | FE | 111 11110 | 011110 1000 | 100001 0111 | | | ✓ | | | | ✓ | | | | ✓ | | [✓] | | | | ✓ |

[✓] = UST Specific Application (boxed)

Usage

| Code Group | Notes | Applicability - After | | | | | | | | | | | | | Applicability - Before | | | | | | | | | | | | | |
|---|---|---|---|---|---|---|---|---|---|---|---|---|---|---|---|---|---|---|---|---|---|---|---|---|---|---|---|
| | | /Dx/ | K28.0 | K28.1 | K28.2 | K28.3 | K28.4 | K28.5 | K28.6 | K28.7 | K23.7 | K27.7 | K29.7 | K30.7 | /Dx/ | K28.0 | K28.1 | K28.2 | K28.3 | K28.4 | K28.5 | K28.6 | K28.7 | K23.7 | K27.7 | K29.7 | K30.7 |
| K28.0 | IEEE Reserved | ✓ | ✓ | | | | | ✓ | | | ✓ | ✓ | ✓ | ✓ | ✓ | ✓ | | ✓ | ✓ | ✓ | ✓ | ✓ | ✓ | ✓ | ✓ | ✓ | ✓ |
| K28.1 | IEEE Reserved - Contains a comma | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | | ✓ | ✓ | ✓ | ✓ |
| K28.2 | IEEE Reserved | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ |
| K28.3 | IEEE Reserved | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ |
| K28.4 | IEEE Reserved | ✓ | | | | | | ✓ | | | ✓ | ✓ | ✓ | ✓ | ✓ | ✓ | ✓ | ✓ | ✓ | ✓ | ✓ | ✓ | ✓ | ✓ | ✓ | ✓ | ✓ |
| K28.5 | Contains a comma - First code-group of all ordered_sets that are signaled repeatedly and for the purpose of allowing a receiver to synchronize to the incoming bit stream | ✓ | ✓ | | | | | ✓ | | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ |
| K28.6 | IEEE Reserved | ✓ | ✓ | | | | | ✓ | | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ |
| K28.7 | IEEE Reserved - Contains a comma - used by 1000BASE-X for diagnostic purposes only | ✓ | | | | | | | | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ |
| K23.7 | Carrier_Extend /R/ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ |
| K27.7 | Start_of_Packet /S/ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ |
| K29.7 | End_of_Packet /T/ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ |
| K30.7 | Error_Propagation /V/ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ |

900

| Timeslot | 0 | 1 2 3 4 5 6 7 8 9 10 11 12 13 14 15 16 | 17 |
|---|---|---|---|
| 0 | | Flow Number | Par |
| 1 | | Flow Number | Par |
| N | | Flow Number | Par |

UNIVERSAL SERVICE TRANSPORT TRANSITIONAL ENCODING

CROSS-REFERENCE TO RELATED APPLICATIONS

The present application claims priority to U.S. Provisional Patent Application No. 61/226,972 filed Jul. 20, 2009 by Serge Francois Fourcand and entitled, "Universal Service Transport Transitional Encoding," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Ethernet is the preferred protocol for many types of networks because it is flexible, decentralized, and scalable. Ethernet comprises a family of frame-based computer networking technologies for local area networks (LANs), and defines a number of wiring and signaling standards for the Physical Layer of the Open Systems Interconnection (OSI) networking model and a common addressing format and Media Access Control (MAC) at the Data Link Layer. Ethernet is flexible in that it allows variable-sized data packets to be transported across different types of mediums using various nodes each having different transmission speeds.

Synchronous Optical Networking (SONET)/Synchronous Digital Hierarchy (SDH) are standardized multiplexing protocols that transfer multiple digital bit streams over optical fibers or electrical interfaces. Due to SONET/SDH protocol neutrality and transport-oriented features, SONET/SDH is used for transporting substantially large amounts of telephone calls and data traffic over the same fiber or wire without synchronization problems. SONET/SDH network transmission standards are based on Time-division multiplexing (TDM). TDM is a technology where two or more signals or bit streams are apparently transferred simultaneously as sub-channels in one communication channel but physically take turns on the channel. This is achieved by dividing the time domain into a plurality of recurrent timeslots, e.g. of about same length, one for each sub-channel. As such, one TDM frame corresponds to one timeslot per sub-channel.

SUMMARY

In one embodiment, the disclosure includes an apparatus comprising an apparatus comprising a switch fabric coupled to a plurality of interfaces and configured to switch a plurality of universal service transport (UST) multiplexing (USTM) data streams between the interfaces, wherein the USTM data streams comprise packet-switched traffic, circuit-switched traffic, and transitional signaling that indicates a change of state between the packet-switched traffic and the circuit-switched traffic, wherein the transitional signaling does not indicate the state in every octet of the USTM data streams.

In another embodiment, the disclosure includes a network component comprising at least one processor coupled to a memory and configured to receive a data that corresponds to a flow, identify the flow using a flow map, determine whether there is a change in a state of the flow, send transitional signaling on a USTM data stream that indicates the state of the flow if the state of flow has changed, and send the data on the USTM data stream.

In yet another embodiment, the disclosure includes a method comprising receiving a USTM data stream comprising TDM traffic and Ethernet traffic, demultiplexing a plurality of time slots in the USTM data stream that corresponds to the TDM traffic and the Ethernet traffic, obtaining a plurality of opcodes from transition information in the time slots, separating the TDM traffic and the Ethernet traffic using the opcodes, and switching the TDM traffic in a first switch and the Ethernet traffic in a second switch.

These and other features will be more clearly understood from the following detailed description taken in conjunction with the accompanying drawings and claims.

For a more complete understanding of this disclosure, reference is now made to the following brief description, taken in connection with the accompanying drawings and detailed description, wherein like reference numerals represent like parts.

BRIEF DESCRIPTION OF THE DRAWINGS

FIG. 8 is a chart of an embodiment of a plurality of control symbols.

FIG. 9 is a schematic diagram of an embodiment of a flow map.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

UST is a convergent transport and switching technology, which is being developed by Huawei Technologies. The UST scheme may be used to map packet-switched (or connectionless) traffic and/or circuit-switched (or connection-oriented) traffic into a single stream, which may be transported on a link. The UST technology may provide convergent packet-switched and circuit-switched traffic transport on a single link and support both packet-switched and circuit-switched switching, end-to-end network clock synchronization capabilities, and built-in inter-working with existing protocols that may support circuit-switched service emulation. UST may be compatible with existing SDH/SONET networks and deployed as part of current or emerging packet-based networks, such as Ethernet-based networks.

Disclosed herein are systems and methods for improving connectionless (or packet-switched) traffic and connection-oriented (or circuit-switched) traffic switching using UST technology. The systems and methods comprise a plurality of UST transitional encoding schemes that may be used to support UST, e.g. for SDH/SONET networks and/or Ethernet-based networks. The UST transitional encoding schemes may be used to improve the mapping of TDM traffic and/or Ethernet traffic in a UST transport link, e.g. based on a USTM protocol, by adding traffic transition information without adding substantial overhead to the transport link/stream. Using the USTM protocol, the TDM traffic and the Ethernet traffic may be multiplexed into a plurality of time slots and transported across a link. When the multiplexed traffic reaches its destination, the TDM traffic and the Ethernet traffic may be demultiplexed from the transported USTM stream. The UST transitional encoding schemes may provide improved UST signaling in the USTM traffic, e.g. to indicate the transition of different TDM traffic and/or Ethernet traffic in the USTM stream without using substantial link bandwidth, and thus may reduce link utilization or capacity. In the UST transitional encoding schemes, a plurality of operation codes (opcodes) may be used in the USTM stream to provide different UST signaling indications, e.g. to indicate transitions between different traffic in the stream.

Figure 1:
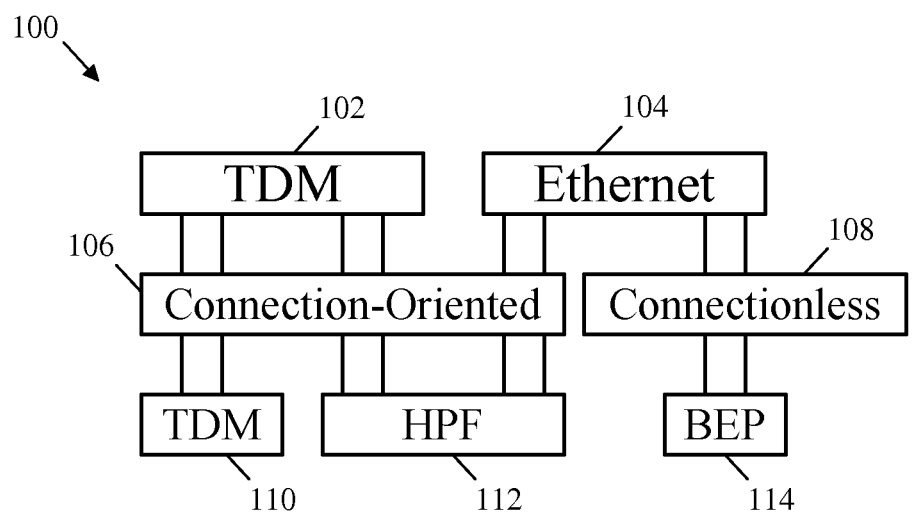
FIG. 1 is a schematic diagram of a plurality of different traffic types.

FIG. 1 illustrates one embodiment of a plurality of different traffic types 100, which may be multiplexed and transported using UST. The different traffic types 100 may comprise TDM traffic 102 and Ethernet traffic 104. For instance, the TDM traffic 102 may correspond to SONET/SDH networks and the Ethernet traffic 104 may correspond to Ethernet-based networks. The TDM traffic 102 and a portion of the Ethernet traffic 104 may correspond to connection-oriented traffic 106. Typically, the connection-oriented traffic 106 may be transported in a network via a plurality of configured or calculated paths, e.g. using a plurality of network switches. Another portion of the Ethernet traffic 104 may correspond to connectionless traffic 108. Typically, the connectionless traffic 108 may be transported between network nodes, e.g. using network bridges, based on a destination address (DA), source address (SA), or both in the traffic. For instance, the connectionless traffic 108 may be forwarded on a hop-by-hop basis with minimal processing at each node. The connectionless traffic 108 may have lower priority than the connection-oriented traffic 106.

In an embodiment, the UST scheme may be used to provide transport, switching, and synchronization for the different traffic types 100. For instance, a switch (not shown) may implement the USTM protocol to transport the different traffic types 100 from a source node to a destination node. The switch may also switch the different traffic types 100 between a plurality of source nodes and a plurality of destination nodes and synchronize their transmissions. Accordingly, the switch may receive and multiplex the different traffic types 100 from the source nodes. The received traffic may comprise the TDM traffic 102 and/or the Ethernet traffic 104, which may be multiplexed into TDM traffic 110, high performance flow (HPF) traffic 112, best-effort packet (BEP) traffic 114, or combinations thereof. The TDM traffic 110, HPF traffic 112, and/or BEP traffic 114 may then be transported to a second switch in, e.g. via a link/stream, using a TDM scheme in their original format (or mode) without further packaging or encapsulation. The second switch may then demultiplex the traffic, e.g. using the USTM protocol, into the originally sent TDM traffic 102 and/or the Ethernet traffic 104 and send the TDM traffic 102 and/or the Ethernet traffic 104 to their corresponding destination nodes.

The TDM traffic 110 and the HPF traffic 112 may correspond to the connection-oriented traffic 106 and may have higher priority than the BEP traffic 114, which may correspond to the connectionless traffic 108. Based on the UST scheme, the connection-oriented traffic 106 and the connectionless traffic 108 may be multiplexed and transported in a single link/stream from a source node to a destination node. As such, the UST scheme may provide Quality of Service (QoS) for high-priority connection-oriented-based services, legacy network compatibility (e.g. for SONET/SDH and Ethernet systems), and substantial high quality network clock distribution and synchronization.

Figure 2A:
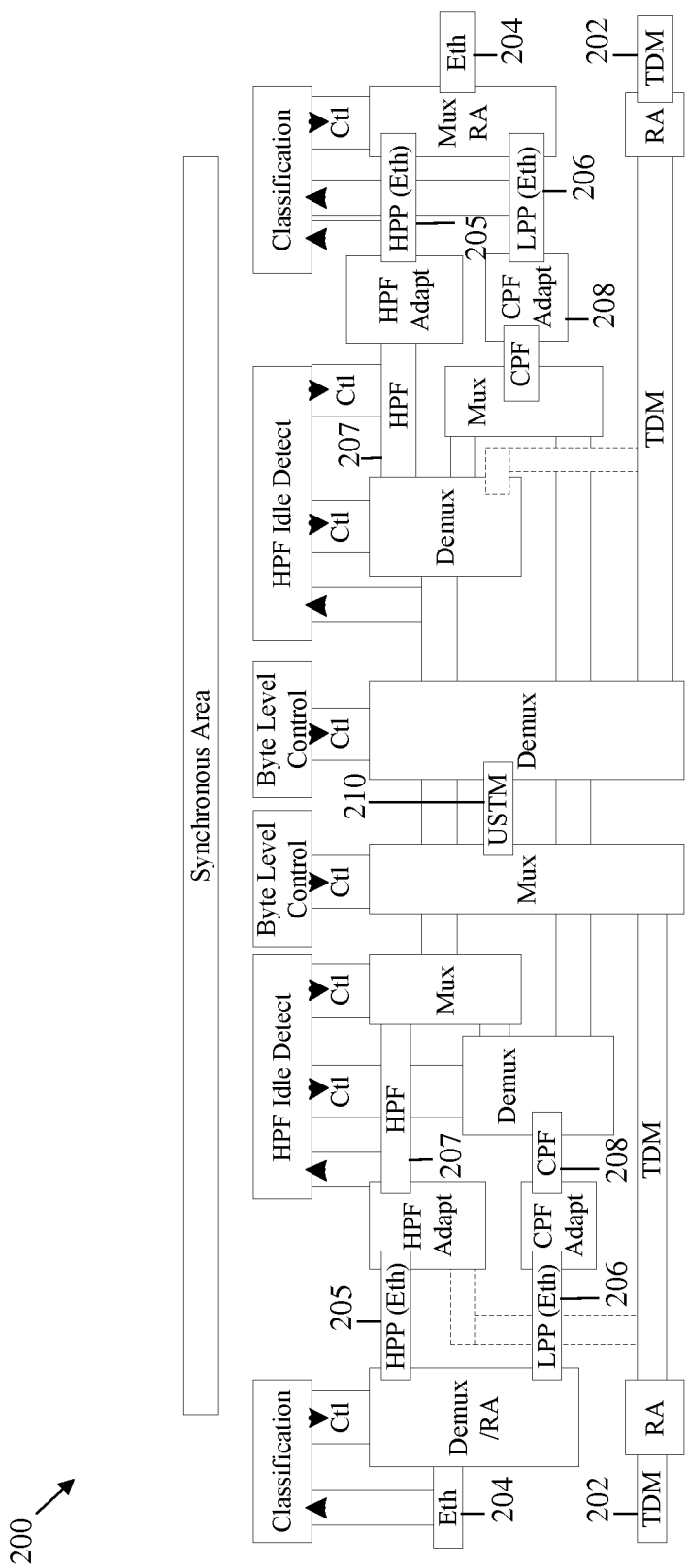
FIG. 2A is a schematic diagram of an embodiment of a universal service transport multiplexing/demultiplexing architecture.

FIG. 2A illustrates an embodiment of a UST multiplexing/demultiplexing architecture 200, e.g. which may be used to transport and/or switch the different traffic types 100. The UST multiplexing/demultiplexing architecture 200 may be based on the USTM protocol and implemented in a switch, e.g. between a source (or ingress) node and a destination (or egress) node. The UST multiplexing/demultiplexing architecture 200 may be used for transporting traffic for a plurality of networks/technologies, such as Ethernet, SONET/SDH, optical transport network (OTN), or other networks. The UST multiplexing/demultiplexing architecture 200 may provide transport, switching, and clock synchronization in a seamless manner for the different networks/technologies. The UST multiplexing/demultiplexing architecture 200 may also provide frequency, absolute phase, and absolute time transport and synchronization for the different networks/technologies.

Initially, the switch may receive TDM traffic 202 and/or Ethernet traffic 204 from the source node. The Ethernet traffic 204 may be demultiplexed (e.g. using a demultiplexer (Demux)/routing agent (RA)) into high priority packets (HPP) traffic 205 and low priority packet (LPP) traffic 206. The HPP traffic 205 may comprise connection-oriented traffic and may be converted to HPF traffic 207 (e.g. using a HPF adapter). The LPP traffic 206 may comprise connectionless traffic and optionally connection-oriented traffic and may be converted to combined packet flow (CPF) traffic 208 (e.g. using a CPF adapter). The CPF traffic 208 may be demultiplexed (e.g. using a Demux) to obtain a first portion that may comprise any connection-oriented traffic that has a relatively high priority and a second portion that may comprise connectionless traffic that has relatively low priority. The first portion of the CPF traffic 208 may be multiplexed with the HPF traffic 207 and the second portion of the CPF traffic corresponds to BEP traffic. Subsequently, The HPF traffic 207 (including the first portion of the CPF traffic 208, if any) and the TDM traffic 202 may be multiplexed (e.g. using a multiplexer (Mux)) into USTM traffic 210, and hence transported via a single link/stream. The BEP traffic may also be multiplexed with the TDM traffic 202 and the HPF traffic 207 in the USTM traffic 210 based on available bandwidth.

At the other end of the switch, the USTM traffic 210 may be processed in a reverse manner to obtain the original TDM traffic 202 and the Ethernet traffic 204. The USTM traffic 210 may be first demultiplexed (e.g. using a Demux) back into the TDM traffic 202, the HPF traffic 207, and the BEP traffic. The original CPF traffic 208 may be obtained by multiplexing (e.g. using a Mux) the first portion of the CPF traffic 208 in the HPF traffic 207 (if any) and the second portion of the CPF traffic 208 in the BEP traffic. The HPF traffic 207 and the CPF traffic 208 may then be converted back into the HPP traffic 205 and the LPP traffic 206, respectively, which may then be multiplexed to obtain the original Ethernet traffic 204 (e.g. using a Mux/RA)).

Figure 2B:
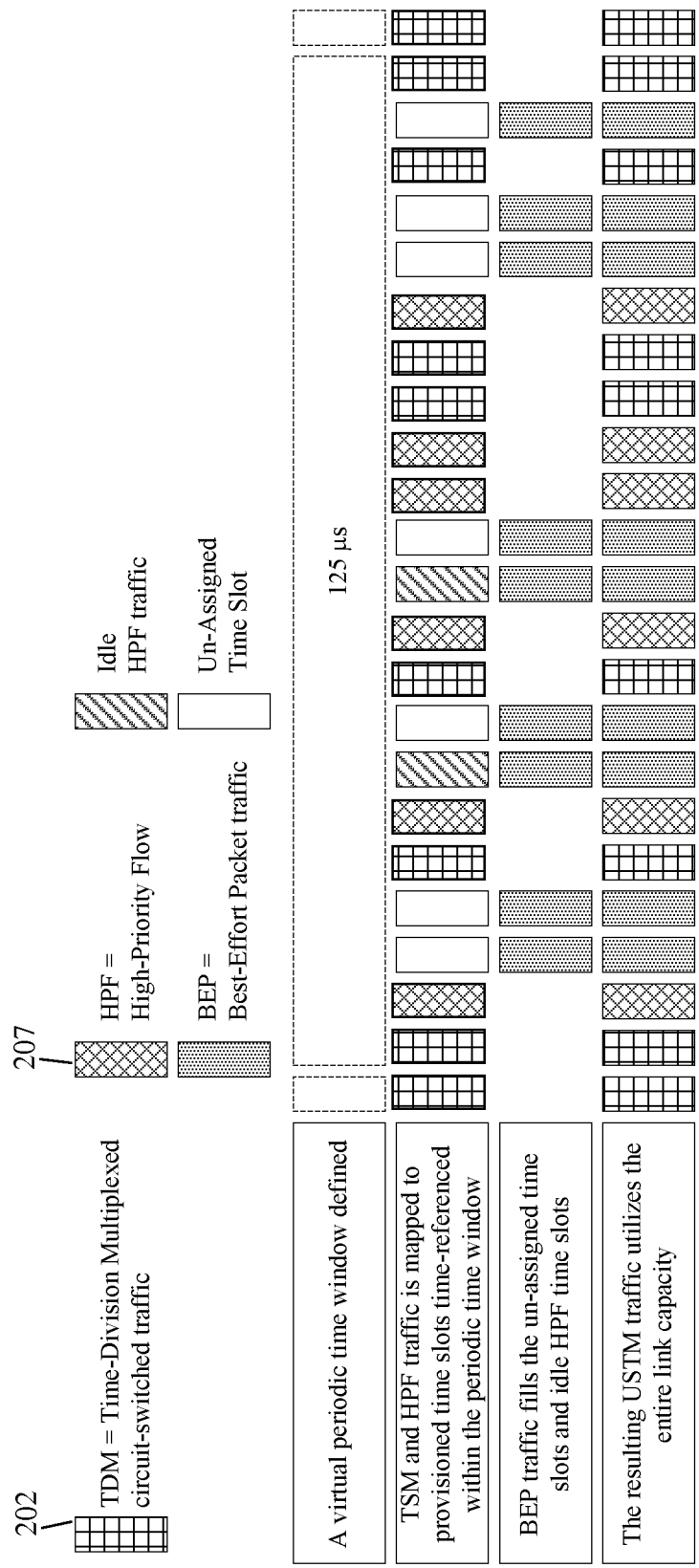
FIG. 2B is a schematic diagram of an embodiment of transported traffic.

FIG. 2B shows the TDM traffic 202 and the HPF traffic 207 (including the first portion of the CPF) may be transported by mapping this traffic to a plurality of provisioned time slots, e.g. within a periodic time window that may be equal to about 125 microseconds (μs). The TDM traffic 202 and the HPF traffic 207 may have relatively high priority and/or allocated guaranteed transmission bandwidth. As such, the periodic time window may comprise a plurality of separate reserved time slots that may be allocated to the TDM traffic 202 and the HPF traffic 207. Typically, the TDM traffic 202 may be mapped in original format into the corresponding time slots, e.g. without using additional UST signaling. Further, the TDM traffic 202 may not support dynamic bandwidth reuse or allocation as the HPF traffic 207. For example, the TDM traffic 202 may not be redistributed into additional or different time slots in the periodic window that are different than the originally allocated time slots of the TDM traffic 202. However in some embodiments, the TDM traffic 202 may be rate adapted and/or mapped to HPF traffic 207. As such, the TDM traffic 202 and the HPF traffic 207 may be mapped into the same quantity of time slots and/or the same time slots in the periodic window. In this case, the TDM traffic 202 may support dynamic bandwidth reuse. In an embodiment, the HPF traffic 207, and similarly the TDM traffic 202, may support dynamic rate adaptation by using a control symbol to suspend/pad some of the corresponding time slots.

Additionally, the lower priority BEP traffic may be mapped into any remaining time slots, which may correspond to the remaining or available transmission bandwidth after allocating the TDM traffic 202 and the HPF traffic 207. The remaining time slots may comprise unassigned time slots (indicated by empty boxes), where the TDM traffic 202 and the HPF traffic 207 are not transmitted and/or allocated bandwidth. The remaining time slots may also comprise idle HPF traffic time slots (indicated by hashed boxes), where HPF traffic transmission is idle. For instance, the BEP traffic may be mapped in to the remaining time slots in the periodic window in a dynamic manner on a byte-by-byte basis. The BEP traffic transmission may be interrupted to transport other higher priority packets, e.g. the HPF traffic 207 and/or the TDM traffic 202, by reallocating some of the time slots of the BEP traffic to the higher priority traffic. Further, the BEP traffic may support dynamic rate adaptation by using a control symbol to suspend/pad some of the corresponding time slots.

In some embodiments, the TDM traffic 202, the HPF traffic 207, and the BEP traffic that are allocated to the times slots in the periodic window may transported in any combination and over any quantity of links/streams between the ingress node and the egress node, e.g. in the switch fabric. For example, the three traffic types may be transported over three separate buses within their allocated time slots in the periodic window. Alternatively, the TDM traffic 202 and the HPF traffic 207 may be transported over a first bus and the BEP traffic may be transported over a second bus within their allocated time slots.

In an embodiment, the USTM traffic 210 may also comprise UST transitional encoding to indicate different transitions between different traffic in the USTM traffic 210. The UST transitional encoding may provide UST signaling that may indicate the beginning and/or end of different traffic streams, e.g. TDM traffic, HPF traffic, and/or BEP traffic, in the USTM traffic 210. The UST transitional encoding may improve the transport, switching, and/or synchronization of the different traffic types in the transport stream. Specifically, the UST transitional encoding may be used to indicate the transitions between the different traffic types in the transport stream without using a substantial bandwidth of the transport stream, e.g. without using a substantial quantity of time slots in the periodic time window. Accordingly, a plurality of UST transitional encoding schemes may be used to provide improved UST signaling in the USTM traffic and improve link utilization or capacity.

Unlike the case of circuit-switched or connection-oriented traffic, which may be transported using fixed-bandwidth methods, transporting packet-switched or connectionless traffic may require some control information, such as knowledge about traffic activity and/or boundaries, for instance to take advantage of bandwidth sharing when transporting TDM traffic. UST signaling may be embedded in UST traffic to provide such control information for multiplexed HPF and BEP traffic in the transport stream. The UST signaling may provide similar functionality as provided by the Ethernet physical layer, e.g. to indicate or identify the packet boundaries. Specifically, a UST transitional encoding may be provided in the transport stream to indicate or signal the transitions between different traffic types and/or flows in the stream, and thus to track the active or idle state of each flow in the stream. For example, a logical flow in the transported traffic may correspond to a logical HPF virtual connection or a continuous instance of BEP traffic. Indicating the transitions between the traffic types and/or flows instead of signaling more detailed information about different traffic activities may reduce the amount of control information that may be exchanged and hence reduce overhead on the link.

Further, circuit-switched or connection-oriented traffic, such as TDM traffic, may be frequency or rate adapted before transporting the traffic using UST, e.g. when the original frequency of the received TDM traffic in the TDM network is different than the transmission frequency in the UST transport network. Frequency or rate adaptation may be achieved by over-provisioning the TDM channel (e.g. in the UST transport network) that may be allocated to transport the circuit-switched traffic and using the excess bandwidth to insert padding and/or TDM control information, e.g. operation, administration, and management (OAM) information. For example, the received TDM traffic may be allocated additional time slots in the periodic time window to add UST transitional encoding, and hence signal such control information.

Figure 3:
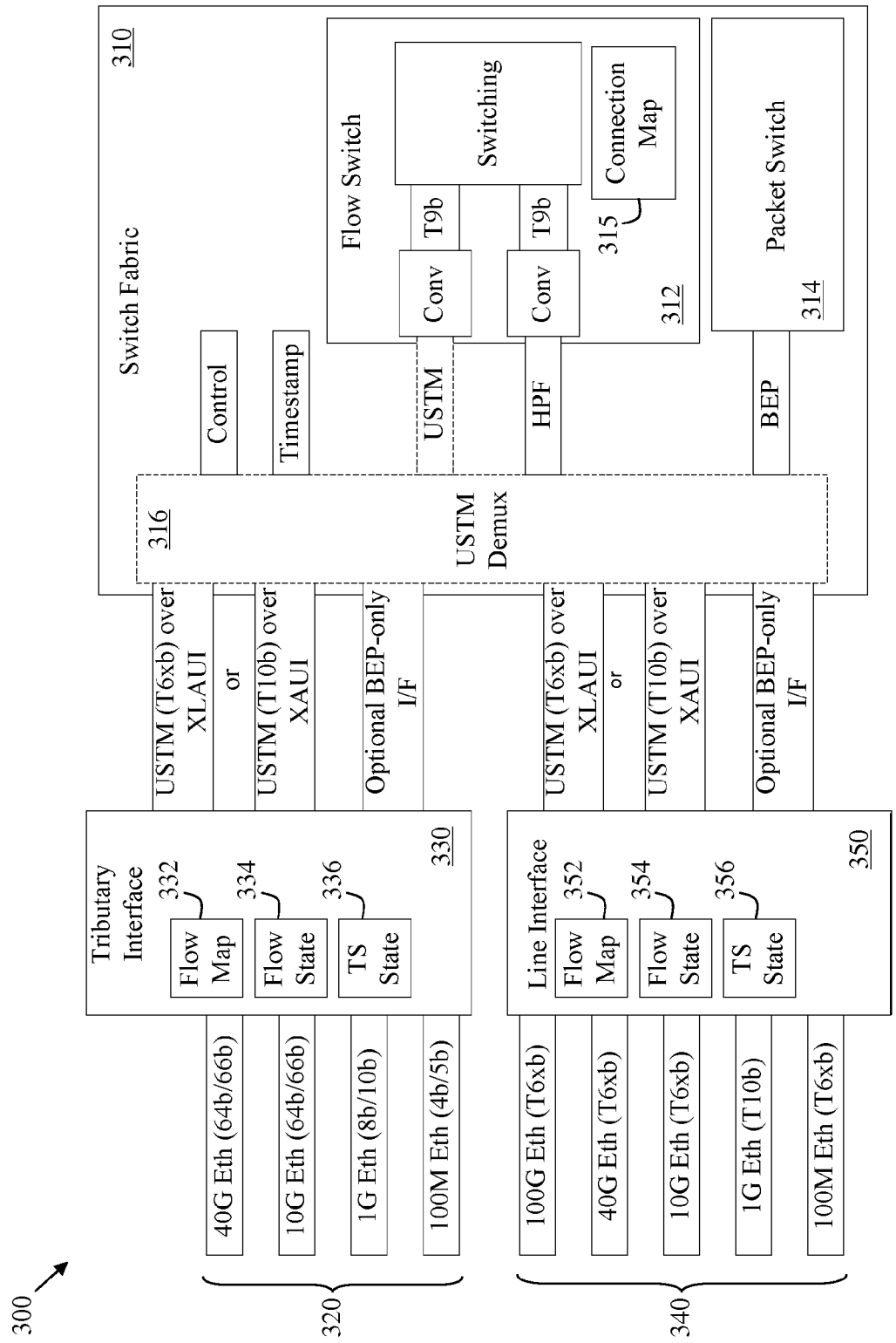
FIG. 3 is a schematic diagram of an embodiment of a UST switch apparatus.

FIG. 3 illustrates one embodiment of a UST switch apparatus 300, which may provide transport, switching, and synchronization for different traffic types, e.g. TDM, HPF, and/or BEP traffic. The UST switch apparatus may comprise a switch fabric 310 coupled to a plurality of first Ethernet links 320 via a tributary interface 330 and to a plurality of second Ethernet links 340 via a line interface 350. The first Ethernet links 320 may be coupled to a plurality of first nodes (not shown) and the second Ethernet links 340 may be coupled to a plurality of second nodes (not shown). The first nodes and second nodes may be located in the same network, e.g. Ethernet network, or different networks. Using the UST switch apparatus 300, the traffic may be transported from any of the first nodes to any of the second nodes passing by the first Ethernet links 320, the tributary interface 330, the switch fabric 310, the line interface 350, and subsequently the second Ethernet links 340. Additionally or alternatively, traffic may be transported from the second nodes to the first nodes passing by the second Ethernet links 340, the line interface 350, the switch fabric 310, the tributary interface 330, and subsequently the first Ethernet link 320.

The tributary interface 330 may be configured to receive and/or forward different traffic types over the first links 320, e.g. in the original form or format of the traffic. Additionally, the tributary interface 330 may receive and/or send USTM traffic and/or BEP traffic from/to the switch fabric 310, e.g. via a 10G Attachment Unit Interface (XAUI), a 40G Attachment Unit Interface (XLAUI), or other interface, such as a BEP-only interface. In an embodiment, the USTM traffic transported over a XLAUI may be mapped using a T6xb encoding scheme, which may be based on a 64b/66b encoding format, as described below. Alternatively, the USTM traffic transported over a XAUI may be mapped using a T10b encoding scheme, which may be based on an 8b/10b encoding format, as shown below. The tributary interface 330 may also comprise a flow map 332, a flow state table 334, and a time slot (TS) state table 330, which may be used to track the state of the flows and time slots, as described in detail below.

The switch fabric 310 may be configured to receive and switch different traffic types from any of the first links 320 and/or the second links 340 and forward the traffic on any of the second links 340 and/or the first link 320. The traffic may be received and forwarded via the tributary interface 330 and/or the line interface 350. The first links 320 and the second links 340 may correspond to 100 Gigabit (G) Ethernet system, 40G Ethernet, and/or 10G Ethernet systems and the Ethernet traffic in any of the links may be encoded based on different schemes or formats (e.g. 64b/66b, 8b/10b, 4b/5b, T6xb, and/or T10b). In other embodiments, other arrangements may be used for the switch fabric 310, the tributary interface 330, the line interface 350, and/or their sub-components.

The switch fabric 310 may comprise a USTM Demux 316, a flow switch 312 comprising a connection map 315, and a packet switch 314. The USTM Demux 316 may be configured to receive the USTM traffic from the tributary interface 330 and/or the line interface 350, demultiplex the traffic into TDM traffic, HPF traffic, and/or BEP traffic, and forward the traffic to the flow switch 312 and/or the packet switch 314. The flow switch 312 may be configured to receive and switch USTM traffic that may include TDM traffic and/or HPF traffic between the first links 320 and the second links 340. The connection map 315 may be used to support time-based switching, e.g. for TDM traffic. The packet switch 314 may be configured to receive and switch BEP traffic between the first links 320 and the second links 340. The USTM Demux 316 may then receive the switched TDM traffic, HPF traffic, and/or BEP traffic from the flow switch 312 and/or the packet switch 314, multiplex the traffic into USTM traffic, and forward the USTM traffic to the tributary interface 330 and/or the line interface 350.

Similar to the tributary interface 330, the line interface 350 may be configured to receive and/or forward different traffic types over the second links 340 and may receive and/or send USTM traffic and/or BEP traffic from/to the switch fabric 310. Specifically, the interfaces 340 may carry USTM traffic over the various encoding schemes shown in FIG. 3. The line interface 350 may comprise a flow map 352, a flow state table 354, and a time slot (TS) state table 356, which may be used to track the state of the flows and time slots.

In an embodiment, the UST transitional encoding may be provided using a plurality of control symbols in the USTM stream, e.g. for padding and/or OAM support. The control symbols may comprise a plurality of single opcodes for different control functions, which may be used in the time slots in the time window. A multipart opcode may also be used to provide additional or continued UST signaling in a time slot, e.g. to provide additional or more advanced control functions. For example, a plurality of multipart opcodes may be used in a time window or a time slot to provide additional UST signaling. The opcode and multipart opcode may be encoded using a 64b/66b encoding format.

Table 1 shows a UST transitional signaling for different transition types in the USTM traffic. The UST transitional signaling may correspond to a T6xb encoding scheme, which is described in detail below. As shown, a set of UST transition signals may be used for each of the HPF, BEP, and TDM traffic, for instance per time slot, per flow, or per UST frame. The UST transition signaling may be provided using a single opcode for each transition type, which may comprise invalid/fill, start of UST frame, HPF active, HPF idle, BEP active, BEP idle, continuity check (CC), and start of multipart opcode. The invalid/fill opcode or signal may be used in any of the HPF, BEP, and TDM traffic on a time slot basis. The CC opcode may be used in any of the HPF, BEP, and TDM traffic on a flow basis. The start of UST frame opcode may be used per each UST frame. For instance, a plurality of consecutive start of UST frame control symbols may be used to achieve link level error propagation. The HPF active and idle opcodes may be used in the HPF traffic on a flow basis. The BEP active and idle opcodes may be used in any of the BEP and HPF traffic on a flow basis. The start of multipart opcode may be used in any of the HPF, BEP, and TDM traffic on a time slot basis, where multiple opcodes may be used to indicate the continuation of signaling information.

TABLE 1

UST transitional signaling.

| Description | HPF | BEP | TDM | Association |
|---|---|---|---|---|
| Invalid/Fill | ✓ | ✓ | ✓ | Timeslot |
| Start of UST Frame | | | | UST Frame |
| HPF -> active | ✓ | | | Flow |
| HPF -> idle | ✓ | | | Flow |
| BEP -> active | ✓ | ✓ | | Flow |
| BEP -> idle | ✓ | ✓ | | Flow |
| Continuity Check (CC) | ✓ | ✓ | ✓ | Flow |
| Start of Multipart Opcode | ✓ | ✓ | ✓ | Timeslot |

Figures 4, 5A:
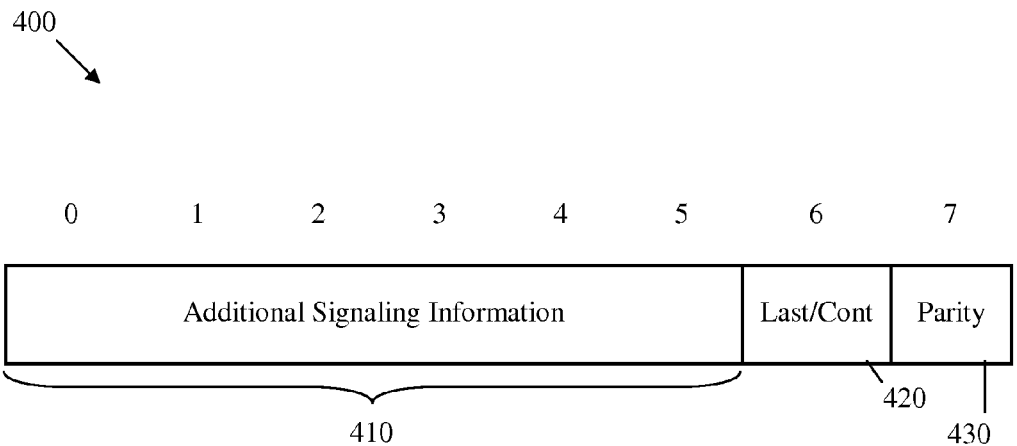
FIG. 4 is a schematic diagram of an embodiment of a multipart opcode signaling unit (SU).
FIG. 5A is a schematic diagram of an embodiment of an encoding block.

FIG. 4 illustrates an embodiment of a multipart opcode SU 400, which maybe used to provide continued or additional signaling information in the USTM traffic. The multipart opcode SU 400 may comprise an octet transmitted within a time slot. The octet may comprise a signaling field 410, a continuation field 420, and a parity field 430. The signaling field 410 may comprise an opcode or a multipart opcode and may comprise about six bits (e.g. bit zero to bit five) that may specify the signaling information. The continuation field 420 may comprise about one bit (e.g. bit 6) and may be used to indicate whether the multipart opcode SU 400 comprises the last multipart opcode of the continued signaling information or is followed by a subsequent octet that comprises more signaling information. For instance, bit 6 may be set to about zero to indicate that the multipart opcode SU 400 comprises the last multipart opcode of the signaling information or to about one to indicate that the signaling information is continued in another multipart opcode in a subsequent octet, e.g. in the same or subsequent time slot. The parity field 430 may comprise about one bit (e.g. bit 7) and may be used to detect errors in the transmitted data.

The signaling information in the multipart opcode SU 400 may be used to indicate traffic flow setup, flow tear-down, increased flow bandwidth, decreased flow bandwidth, and/or other traffic related information. As such, a plurality of multipart opcodes may signal additional operation on a per time slot basis, e.g. in the periodic time windows (e.g. about 125 µs time windows) subsequent to the initial opcode. The information in the multipart opcodes may comprise a flow number that indicates the same flow for all the multipart opcodes in the time slot(s). The information in the multipart opcode SU 400 may comprise information about the destination or egress node for the transported traffic, which may then be used to determine the next hop. In an embodiment, the multipart opcodes in a plurality of multipart opcode signaling blocks may be used to provide logical flow-oriented OAM operations, which may be mapped into tagged BEP and/or HPF packets in the transported stream.

Figure 5B:
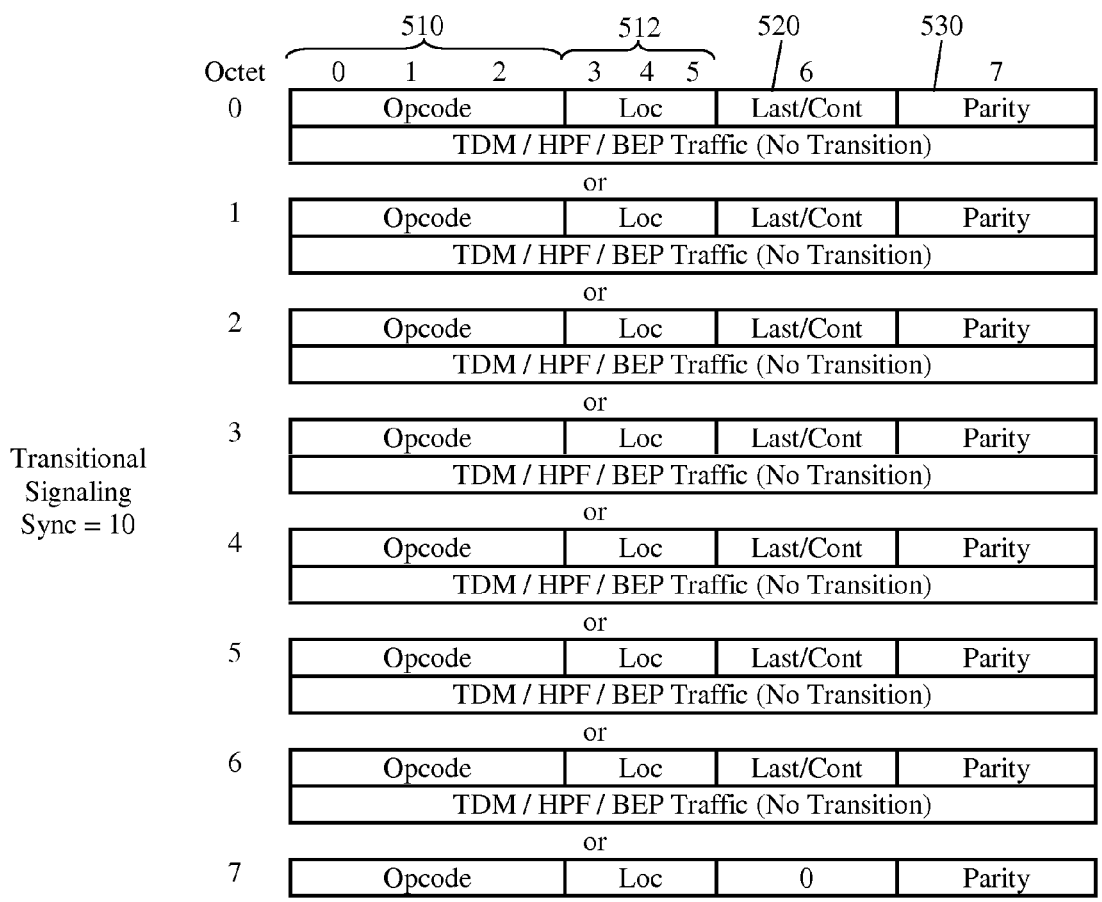
FIG. 5B is a schematic diagram of another embodiment of an encoding block.

FIGS. 5A and 5B illustrate an embodiment of an encoding block 500, which may correspond to a T6xb encoding scheme. The T6xb encoding scheme may be used to multiplex TDM traffic, HPF traffic, BEP traffic, or combinations thereof using the 64b/66b encoding format, e.g. by mapping each about 66 bits in the stream into about 64 bits. The 64b/66b encoding format may be used for Ethernet networks, such as for about 10G Ethernet, about 40G Ethernet, or about 100G Ethernet systems. Alternatively, the T6xb encoding scheme may be used to signal transitions in the USTM traffic, e.g. to maintain a per-flow status for HPF and/or BEP traffic, and thus track the active and idle states of each flow.

As shown in FIG. 5A, the encoding block 500 may comprise up to about eight octets, e.g. in the USTM traffic, that correspond to a 64b/66b block. The octets may comprise TDM, HPF, and/or BEP traffic without transitional signal or information. As such, the encoding block 500 may be preceded by a sync value (e.g. in the transport stream), that indicates the absence of transition information in the encoding block 500. For example, the sync value may be set to about one or "01" to indicate that no transition signaling is provided in a subsequent encoding block 500. Alternatively, at least one octet (e.g. octet 1) in the encoding block 500 may comprise transitional signaling, as shown in FIG. 5B. As such, the encoding block 500 may be preceded by a sync value (e.g. of about 10) that indicates the presence of transition information in the encoding block 500. As such, at least a portion of the transition information may be located at the front of the encoding block 500, e.g. in the first octet of the encoding block 500, as described below.

In the case of transitional signaling, the encoding block 500 may comprise at least a first octet (e.g. from bit zero to bit seven) that comprises an opcode field 510, a location field 512, a continuation field 520, and a parity field 530. The opcode field 510 may comprise about three bits (e.g. bit zero to bit two) and may indicate a transitional signal, e.g. as shown in Table 1 or Table 2 below. The location field 512 may comprise about three bits (e.g. from bit three to bit five) and may indicate the location of the transition in the traffic. For example, the three bits may indicate the location in the 64b/66b block in bytes where the traffic transition occurs. The three bits may indicate an integer value from about zero byte to about seven bytes.

The continuation field 520 may comprise about one bit (e.g. bit 6) that may be used to indicate whether the transitional signaling octet is the last in the encoding block 500. For instance, bit 6 may be set to about zero to indicate that the next octet in the 64b/66b block comprises TDM, HPF, and/or BEP traffic without transitions or to about one to indicate that the next octet comprises additional signaling information. For example, the next octet in the encoding block 500 may correspond to a multipart opcode signaling block 500. The parity field 530 may comprise about one bit (e.g. bit 7) and may be used to detect errors in the transmitted data.

Table 2 shows another a UST transitional signaling based on the T6xb encoding scheme. The UST transition signaling may be provided using the opcode fields 510 in the encoding block 500. The opcode fields 510 may be used to indicate a set of UST transition signals, which may comprise idle state, start of UST frame, HPF start of packet, HPF end of packet, BEP start of packet, BEP end of packet, CC, and start of multipart opcode. The idle state may be indicated by an opcode value of about zero and may be used in any of the HPF, BEP, and TDM traffic on a time slot basis. The start of UST frame may be indicated by an opcode value of about one and may be used per each UST frame. The HPF start of frame and end of frame may be indicated by opcode values of about two and about three, respectively, and may be used in the HPF traffic on a flow basis. The BEP start of frame and end of frame may be indicated by opcode values of about four and about five, respectively, and may be used in any of the BEP and HPF traffic on a flow basis. The CC may be indicated by an opcode value of about six and may be used in any of the HPF, BEP, and TDM traffic on a flow basis. The start of multipart may be indicated by an opcode value of about seven and may be used in any of the HPF, BEP, and TDM traffic on a time slot basis.

TABLE 2

UST transitional signaling using T6xb encoding.

| Opcode | Description | HPF | BEP | TDM | Association |
|---|---|---|---|---|---|
| 0 | Idle | ✓ | ✓ | ✓ | Timeslot |
| 1 | Start_of_UST_Frame | | | | UST Frame |
| 2 | HPF_Start_of_Packet | ✓ | | | Flow |
| 3 | HPF_End_of_Packet | ✓ | | | Flow |
| 4 | BEP_Start_of_Packet | ✓ | ✓ | | Flow |
| 5 | BEP_End_of_Packet | ✓ | ✓ | | Flow |
| 6 | Continuity_Check (CC) | ✓ | ✓ | ✓ | Flow |
| 7 | Start_of_Multipart_Opcode | ✓ | ✓ | ✓ | Timeslot |

When a transition is signaled in the encoding block 500, at least one octet in the 64b/66b block may comprise the signaling information instead of the actual traffic transmitted. In this case, the actual traffic may be offset by a quantity of bytes that correspond to the quantity of octets used for signaling. Thus, the octets that succeed the signaling octets in the 64b/66b block and that comprise TDM, HPF, and/or BEP traffic may be offset by at least about one byte and at most about seven bytes. When the 64b/66b block is received, the original position and values of the traffic, which may be offset due to adding the transition information, may be extrapolated from the transitional signaling fields or octets. For instance, when a TDM traffic in a 64b/66b block is demultiplexed, the corresponding octets may be restored to their respective positions (e.g. with respect to a transmission time window) before further processing. Using the encoding block 500, the originally transmitted traffic may be shifted at most by about seven octets and within a single 64b/66b block. Consequently, a relatively small amount of buffering may be required to realign a flow at the destination node. For example, a buffer size of about 8 octets may be sufficient, which may not add substantial latency or delay in the data stream.

Figure 6:
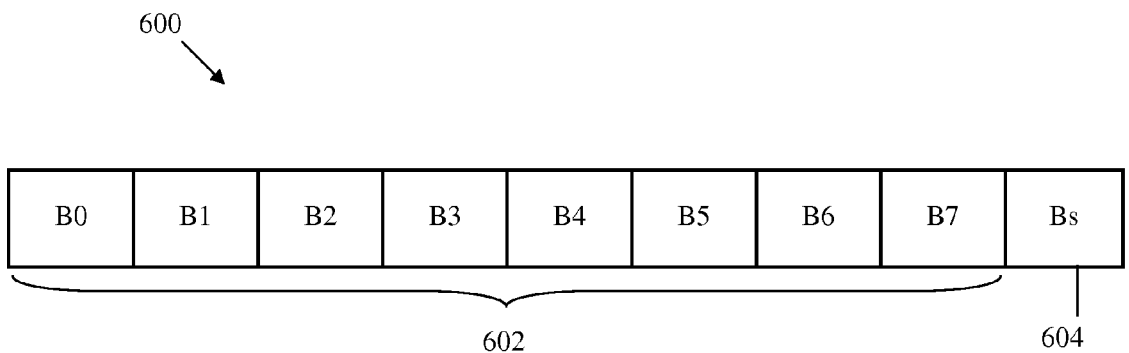
FIG. 6 is a schematic diagram of an embodiment of an encoding SU.

FIG. 6 illustrates an embodiment of an encoding SU 600, which may be used to transport USTM traffic or provide transitional signaling. The encoding SU 600 may correspond to a T9b encoding format, which may comprise about eight bits followed by one additional signaling bit and may be used in about nine-bit wide data paths. For example, the T9b encoding format may be used in a field-programmable gate array (FPGA) or application-specific integrated circuit (ASIC) switching component. The T9b encoding format may be used instead of the 64b/66b encoding format to provide more signaling information, e.g. per block, and thus reduce the amount of look-up information or control structures (e.g. look-up tables) and/or resources that may be needed to process the signaling information in the USTM traffic. In an embodiment, the encoding SU 600 may have a bandwidth of about 64 Kilobytes per second (Kb/s), e.g. based on a time window of about 125 μs.

Similar to the octets of the encoding block 500, the encoding SU 600 may comprise USTM traffic or alternatively transition information. Specifically, the encoding SU 600 may comprise about nine bits, where a first portion 602 may comprise about eight bits (e.g. B0 to B8) and a second portion 604 may comprise the remaining signaling bit (e.g. Bs). The first portion 602 may comprise TDM, HPF, or BEP traffic. Alternatively, the first portion 602 may comprise similar signaling and other information as the opcode field 510, the location field 512, and the continuation field 520 in the encoding block 500. The second portion 604 may comprise about one parity bit (e.g. bit 7) and may be used to detect errors in the transmitted data. The parity bit may be used to implement a parity check for the remaining bits in the first portion 602. Additionally, the parity bit may be used to check whether the encoding SU 600 comprises traffic data or signaling (or control) information. For instance, if the quantity of one-bits in the encoding SU 600 including the parity bit Bs is odd, then the encoding SU 600 may be a data SU. Otherwise, the encoding SU 600 may be a control SU.

In the case of a control SU, the first portion 602 may comprise any of a plurality of opcodes that indicates the transitional signals in Table 1 or Table 2. The first portion 602 may also indicate other transitional information using other opcodes. Since a relatively small number of opcodes, e.g. about eight, may be used in the first portion 602, the T9b encoding format may provide additional codes that may be used in the encoding SU 600, for instance to provide efficient error detection. The bit encoding in the opcodes or codes that may be used in the first portion 602 may be selected or determined such that to provide sufficient distance between the bit sequences or codes. Thus, the detection capabilities using the parity bit may be improved.

Figure 7:
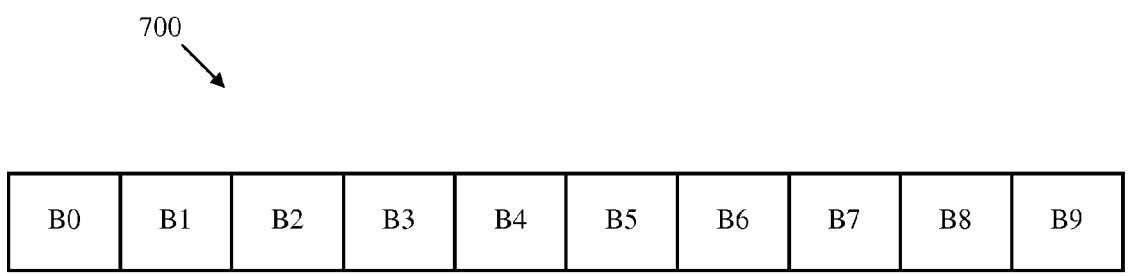
FIG. 7 is a schematic diagram of another embodiment of an encoding SU.

FIG. 7 illustrates an embodiment of an encoding SU 700, which may correspond to a T10b encoding scheme. The T10b encoding scheme may be used to multiplex TDM traffic, HPF traffic, BEP traffic, or combinations thereof using the 8b/10b encoding format, e.g. by mapping each about 10 bits in the stream into about eight bits. The 8b/10b encoding format may be used in a Gigabit Ethernet system or a 10 Gigabit XAUI, which may be used to transport Ethernet data within a backplane. Alternatively, the T10b encoding scheme may be used to signal transitions in the USTM traffic. The T10b encoding format may be used instead of the 64b/66b encoding format and the T9b encoding format to provide more signaling information, e.g. per block, and thus reduce the amount of control structures and/or resources in the switch.

Similar to the octets of the encoding block 500, the encoding SU 700 may comprise traffic data or control (e.g. transitional or signaling) opcodes. Specifically, the encoding SU 700 may comprise about 10 bits, which may be used to indicate the traffic data or the control opcodes, such as the transitional signals in Table 1, Table 2, or Table 3 below. In an embodiment, the traffic data in the encoding SU 700 may be encoded using at least some of the standard 8b/10b data symbols and the control opcodes may be encoded using a specified set of 8b/10b control symbols.

FIG. 8 and Table 3 show an example of the set of 8b/10b control symbols 800 that may be used as control opcodes in the encoding SU 700. FIG. 8 shows a set of suitable control opcodes that may be selected from a plurality of 8b/10b control symbols 800 to indicate different transition types. The selected control opcodes may correspond to about eight code groups (e.g. K28.1, K28.2, K28.3, K28.4, K28.5, K28.6, K29.7, and K30.7) that may be used as indicated by the shaded blocks. Table 3 summarizes the transition types that may be indicates by the selected control opcodes. FIG. 8 and Table 3 illustrate one set of control opcodes that may be selected from the 8b/10b control symbols 800 to indicate different transition types, but other sets that comprise other control opcodes from the 8b/10b control symbols 800 may be used in other embodiments.

TABLE 3

UST transitional signaling using T10b encoding.

| 8b/10b Code | Description | HPF | BEP | TDM | Association |
|---|---|---|---|---|---|
| K28.5 | Idle | ✓ | ✓ | ✓ | Timeslot |
| K28.1 | Start_of_UST_Frame | | | | UST Frame |
| K28.2 | HPF_Start_of_Packet | ✓ | | | Flow |
| K28.3 | HPF_End_of_Packet | ✓ | | | Flow |
| K28.4 | BEP_Start_of_Packet | ✓ | ✓ | | Flow |
| K29.7 | BEP_End_of_Packet | ✓ | ✓ | | Flow |
| K28.6 | Continuity_Check (CC) | ✓ | ✓ | ✓ | Flow |
| K30.7 | Start_of_Multipart_Opcode | ✓ | ✓ | ✓ | Timeslot |

In an embodiment, to process the signaling information in the USTM traffic and handle the encoding formats above, the switch may maintain a control structure, such as a flow map and/or a time slot (TS) state table, for instance in a memory component or database storage. The control structure may be used to track the states of the traffic flows or the time slots in the USTM data stream, for example to allow the reuse of the HPF allocated time slots by BEP traffic when the HPF traffic is idle. Additionally, the control structure may support establishing data flows, tearing down data flows, increasing the bandwidths of the flows, and/or decreasing the bandwidths. The control structure may also be used to remember and recall a previous state of a flow when interrupted by an idle symbol (or opcode).

FIG. 9 illustrates an embodiment of a flow map 900, which may be a control structure used to handle the USTM traffic. The flow map 900 may comprise a plurality of entries that map a plurality of time slots, e.g. in a periodic time window. For instance, the flow map 900 may comprise about N entries (N is an integer) that correspond to about N time slot in the periodic time window. Each entry in the flow map 900 may comprise a flow number field 902, which may comprise a flow identifier (ID) that indicates a flow in the USTM data stream, and a parity field 904, which may be used to check parity. For instance, the flow number field 902 may comprise about 17 bits (e.g. from bit zero to bit 16) and the parity field 904 may comprise about one bit (e.g. bit seven). As such, the flow map 900 may support about 128,000 flows in the data stream, which may be sufficient to support about 100G Ethernet systems. The flow number field 902 may be increased in length (e.g. in quantity of bits) to support a larger number of flows if desired. The flows may correspond to HPF traffic flows or BEP traffic flows.

Table 4 shows a flow numbering scheme that comprises a set of flow numbers or IDs, which may be used to indicate different types of traffic flows in the data stream (e.g. assignment). The different types of traffic flows may comprise un-assigned traffic (e.g. BEP traffic), Do Not Use (DNU) traffic, and HPF/TDM traffic. Some of the flow numbers may not be used and/or may be reserved for future use. The flow map 900 may be updated locally, e.g. using software, or dynamically by sending OAM signaling embedded in the time slots. For instance, the flow map 900 may be updated using multipart opcodes (e.g. multipart opcode SU 400) to establish a flow, tear down a flow, increase a flow's bandwidth, decrease a flow's bandwidth, or combinations thereof.

TABLE 4

Flow numbering.

| Flow Number | Assignment |
|---|---|
| 0 | Un-assigned (BEP) |
| 1 | DNU |
| 2 | Reserved |
| 3 | Reserved |
| 4 | Reserved |
| 5 | Reserved |
| 6 | Reserved |
| 7 | Reserved |
| 8 | HPF/TDM |
| N | |

Table 5 illustrates an embodiment of an entry in a TS state table, which may be another control structure used to handle the USTM traffic. Specifically, the TS state table may be used to specify the state of each time slot in the data stream and may comprise an entry for each time slot. The entry may comprise about two bits (e.g. bit zero and bit one), which may each be assigned one of two values to indicate different TS states and different traffic types. For instance, bit zero may be set to about zero to indicate a default TS state or to about one to indicate an OAM pending state. Additionally, bit one may be set to about zero to indicate packet based traffic or to about one to indicate TDM based traffic. In another embodiment, Table 5 or the information in Table 5 may be included in the flow map 900 and/or Table 4.

TABLE 5

TS state table entry.

| Bit | Value | TS State |
|---|---|---|
| 0 | 0 | Default |
| 0 | 1 | OAM Pending |
| 1 | 0 | Packet |
| 1 | 1 | TDM |

Table 6 shows an embodiment of the flow state table, which may be used to keep track of the state of each flow in the data stream. The flow state table may comprise an entry for each flow to indicate its corresponding state. For instance, each entry may comprise a flow number that identifies a flow and a flow state value. The flow state value may be indicated using about two bits (e.g. bit zero and bit one). Table 7 illustrates the flow state values that may be used to indicate different states for the flows, e.g. idle, bearer packet active, OAM packet active, and reserved/spare.

In an embodiment, the USTM traffic may have a granularity equal to about 64 Kb/s, e.g. where the smallest data block size may be equal to about 64 Kb/s. However, in other embodiments, the USTM traffic granularity may be equal to an integer multiple of about 64 Kb/s. Further, the time slots in the data stream may have a granularity of a SONET/SDH column, e.g. about nine bytes per each 125 μs time window. As such, the same two bits may be used about nine times within the 125 μs time window. Such granularity configuration may reduce logic size and thus reduce cost of implementing flow and time slot maps and/or other control structures.

TABLE 6

Flow state table.

| Flow Number | 0 | 1 |
|---|---|---|
| 0 | | Flow State |
| 1 | | Flow State |
| N | | Flow State |

TABLE 7

Flow states.

| Flow State Value | Definition |
|---|---|
| 0 | Idle |
| 1 | Bearer Packet Active |
| 2 | OAM Packet Active |
| 3 | Reserved/Spare |

In an embodiment, the USTM switching system (e.g. the UST switch apparatus 300) may support a floating time window (e.g. of about 125 μs) and the insertion of idle traffic or time slots to provide rate adaptation for the different traffic types. For instance, the rate adaptation may be implemented in the line interface cards, e.g. the tributary interface 330, the line interface 350, and/or other network interfaces. As such, the floating time window may support node-to-node frequency adaptation at the link level. Further, idle cycles (or time slots) may be inserted at any time or location in the USTM data stream to suspend the processing of the data stream and/or provide rate adaptation at the logical flow level. The idle cycles may be inserted for TDM, HPF, and/or BEP traffic, e.g. within or between packets.

In another embodiment, the UST switching system may support a periodic time window (e.g. of about 125 μs), hardware-supported flow map and TS state update, and synchronization mechanisms to provide hitless dynamic bandwidth management. As such, bandwidth management, flow establishment, and flow tear-down may be implemented using OAM codes, as described above. For instance, a node may transmit a multipart opcode to the switch, e.g. on a per-timeslot basis, which may indicate the operation to be performed and the associated flow number. After transmitting the flow number and other parameters, the flow number may be loaded on the next time window, e.g. the next 125 μs boundary. Alternatively, an acknowledgement may be generated and sent by the switch in response to receiving the flow number and other parameters.

Figure 10:
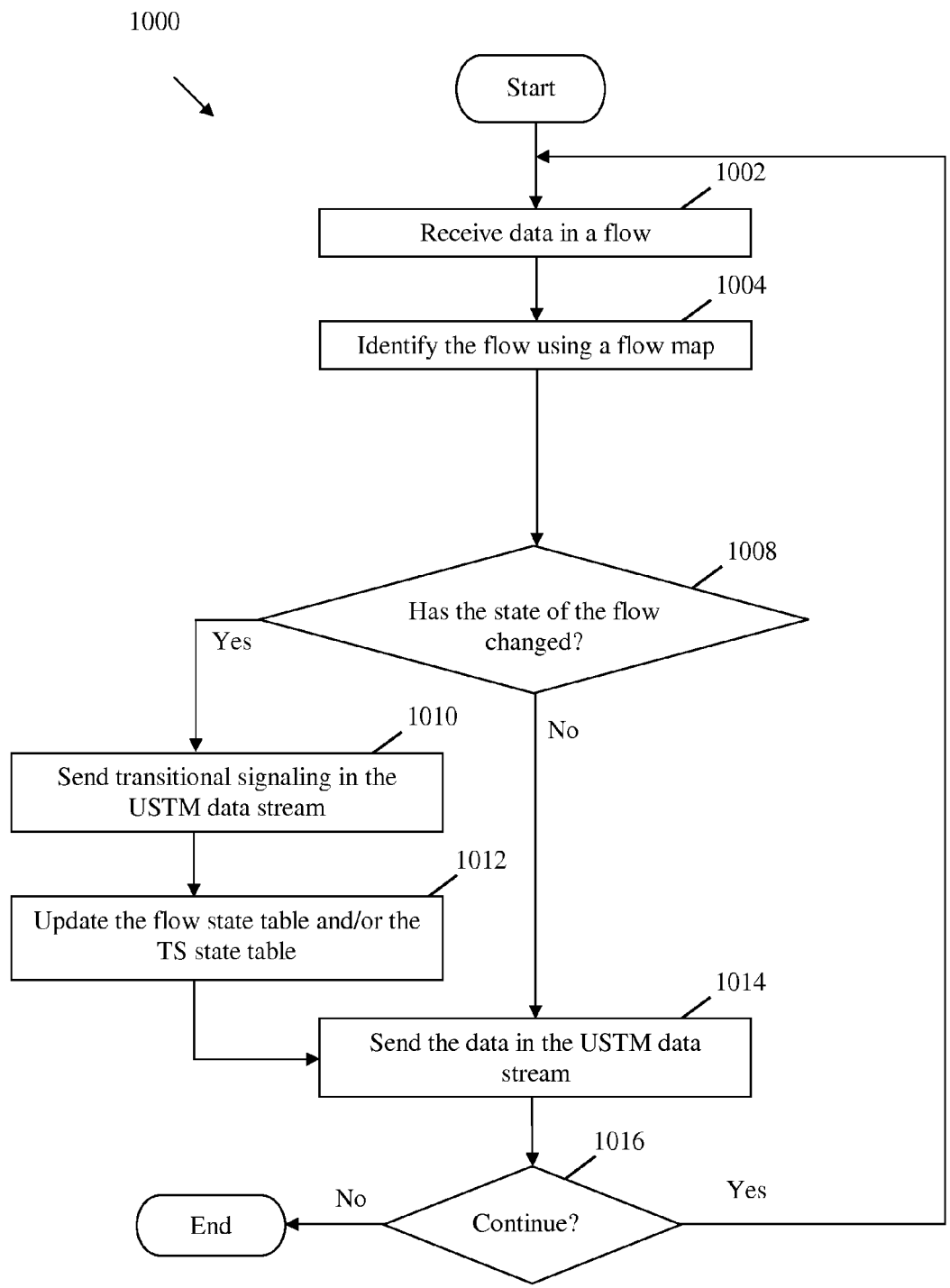
FIG. 10 is a flowchart of an embodiment of a UST signaling method.

FIG. 10 illustrates an embodiment of a UST signaling method 1000, which may be used to transport data in a USTM data stream and provide transition information in the transmitted USTM data stream. The data transported in the USTM data stream may correspond to a plurality of flows and/or traffic types, which may be forwarded from at least one source node. The UST signaling method 1000 may be implemented by a UST switching system, such as the UST switch apparatus 300, where the different steps in the method 1000 may be implemented by any of the components of the apparatus 300.

The method 1000 may begin at block 1002, where a data in a flow may be received. For instance, the tributary interface 330 may receive data in a flow from one of the first links 320, e.g. 100G Ethernet data based on the 64b/66b encoding format. Additionally or alternatively, the tributary interface 330 may receive TDM traffic data, e.g. from a SONET/SDH network. At block 1004, the flow may be identified using a flow map. For instance, the tributary interface 330 may obtain a flow ID from the data that indicates the flow of the received data. The flow ID or number may match an entry in the flow map 332. At block 1008, the method 1000 may determine whether the state of the flow has changed. If the state of the flow has changed, such as from idle to active, then the method 1000 may proceed to block 1010. Otherwise, the method 1000 may proceed to block 1014.

At block 1010, transitional signaling may be sent in the USTM data stream. The transitional signaling may be added to the USTM stream using an opcode, e.g. based on any of the UST encoding schemes described above. The transitional signaling may specify the transition type that occurred in the flow of the received data. At block 1012, the flow state table and/or the TS state table may be updated. For instance, the entry in the flow state table (e.g. Table 6) that corresponds to the flow of the data, e.g. that comprises the same flow ID the data, may be updated to indicate the current changed state of the flow. Additionally or alternatively, an entry in the TS state table (e.g. Table 5) that corresponds to the time slot allocated for the data may be updated to indicate the current changed state.

At block 1014, the data may be sent in the USTM data stream, e.g. in a single link to a switch fabric (e.g. the switch fabric 310). For instance, the tributary interface 330 may send the data in the allocated time slot in the USTM stream over a XLAUI or XAUI interface. At block 1016, the method 1000 may determine whether to continue, e.g. whether there are more data to be received. The method 1000 may return to block 1002 if the reception of data continues. Otherwise, the method 1000 may end.

Figure 11:
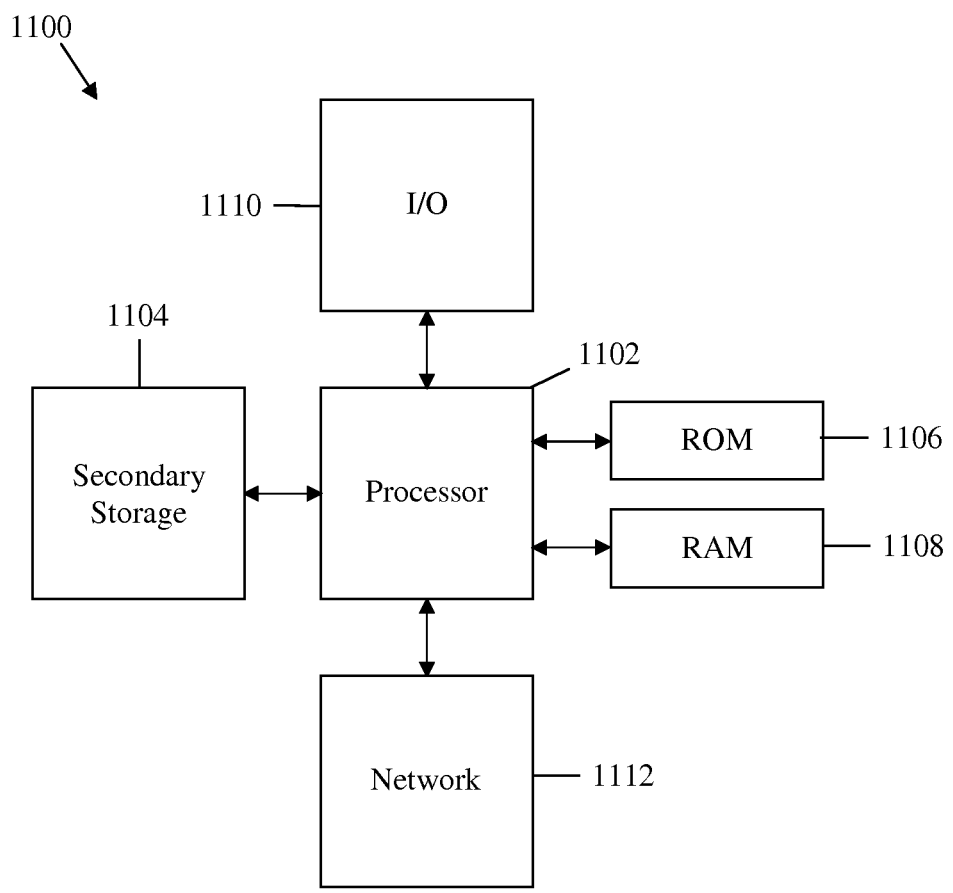
FIG. 11 is a schematic diagram of one embodiment of a general-purpose computer system.

The components described above may be operated in conjunction with any general-purpose network component, such as a computer or network component with sufficient processing power, memory resources, and network throughput capability to handle the necessary workload placed upon it. FIG. 11 illustrates a typical, general-purpose network component 1100 suitable for implementing one or more embodiments of the components disclosed herein. The network component 1100 may include a processor 1102 (which may be referred to as a central processor unit or CPU) that is in communication with any memory devices including secondary storage 1104, read only memory (ROM) 1106, random access memory (RAM) 1108, input/output (I/O) devices 1110, and network connectivity devices 1112, or combinations thereof. The processor 1102 may be implemented as one or more CPU chips, or may be part of one or more ASICs.

The secondary storage 1104 is typically comprised of one or more disk drives or other storage devices and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations. For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a plurality of interfaces;
a switch fabric coupled to the interfaces and configured to switch a data in a data stream received from one of the interfaces to at least some of the other interfaces,
wherein the data stream comprises a plurality of timeslots, a packet-switched traffic, a circuit-switched traffic, and a transitional signaling positioned between the packet-switched traffic and the circuit-switched traffic,
wherein the transitional signaling indicates a change of state between the packet-switched traffic and the circuit-switched traffic, and
wherein the transitional signaling does not indicate the state in every octet of the data stream,
wherein a first timeslot within the data stream carries the transitional signaling,
wherein the first timeslot carrying the transitional signaling comprises a signaling information and one of the packet-switched traffic and the circuit-switched traffic,
wherein the circuit-switched traffic or the packet-switch traffic precedes the signaling information,
wherein the transitional signaling indicator further comprises a location field that indicates a first octet in the first timeslot that carries the signaling information,
wherein an opcode indicates that the first timeslot carrying the transitional signaling is idle when the opcode is set to a first opcode value,
wherein the opcode indicates that the first timeslot carrying the transitional signaling is the start of a universal service transport (UST) frame when the opcode is set to a second opcode value,
wherein the opcode indicates that a second timeslot immediately following the first timeslot carrying the transitional signaling is the start of a high performance flow (HPF) traffic when the opcode is set to a third opcode value,
wherein the opcode indicates that the first timeslot carrying the transitional signaling is the end of the HPF traffic when the opcode is set to a fourth opcode value,
wherein the opcode indicates that the second timeslot immediately following the first timeslot carrying the transitional signaling is the start of best effort packet (BEP) traffic when the opcode is set to a fifth opcode value,
wherein the opcode indicates that the first timeslot carrying the transitional signaling is the end of the BEP traffic when the opcode is set to a sixth opcode value,
wherein the opcode is a continuity check when the opcode is set to a seventh opcode value, and
wherein the opcode indicates that the second timeslot immediately following the first timeslot carrying the transitional signaling is the start of a multipart opcode when the opcode is set to an eighth opcode value.

2. The apparatus of claim 1, wherein the transitional signaling in the data stream indicates a start of the packet switched traffic or the circuit-switched traffic that follows the transitional signaling in the data stream.

3. The apparatus of claim 1, wherein the transitional signaling in the data stream comprises one octet that indicates a continuity check (CC) for a flow of the packet-switched traffic.

4. The apparatus of claim 1, wherein the circuit-switched traffic comprises telephone voice data, wherein the packet-switched traffic comprises high-priority video data and best-effort packet (BEP) data, wherein a first set of assigned time slots within the data stream is allocated to the high-priority video data, wherein a second set of assigned time slots within the data stream is allocated to the telephone voice data, and wherein a set of unassigned time slots within the data stream is allocated to the BEP traffic.

5. The apparatus of claim 1, wherein the packet-switched traffic, the circuit-switched traffic, and the transitional signaling are carried in a plurality of data blocks, and wherein one of the data blocks comprises less than all of the circuit-switched traffic, at least some of the transitional signaling, and none of the packet-switched traffic.

6. The apparatus of claim 5, wherein no single data block comprises the transitional signaling followed by the circuit-switched traffic, and wherein no single data block comprises the transitional signaling followed by the packet-switched traffic.

7. The apparatus of claim 1, wherein the transitional signaling is only one octet long.

8. A network component comprising:
at least one processor coupled to a memory and configured to:
receive a first data flow and a second data flow, wherein the first data flow has a first data flow type, wherein the second data flow has a second data flow type, and wherein the first data flow type is different than the second data flow type;
transmit the first data flow;
subsequently transmit a data type transition indicator that indicates that the prior first data flow type is different than the subsequent second data flow type; and
subsequently transmit the second data flow,
wherein a timeslot carrying the data type transition indicator comprises a signaling information,
wherein the data type transition indicator further comprises a location field that indicates a first octet in the timeslot that carries the signaling information,
wherein the opcode indicates that the timeslot carrying the data type transition indicator is idle when the opcode is set to a first opcode value,
wherein the opcode indicates that the timeslot carrying the data type transition indicator is the start of a universal service transport (UST) frame when the opcode is set to a second opcode value,
wherein the opcode indicates that the second data flow immediately following the timeslot carrying the data type transition indicator is the start of high performance flow (HPF) traffic when the opcode is set to a third opcode value,
wherein the opcode indicates that the timeslot carrying the data type transition indicator is the end of the HPF traffic when the opcode is set to a fourth opcode value,
wherein the opcode indicates that the second data flow immediately following the timeslot carrying the data type transition indicator is the start of best effort packet (BEP) traffic when the opcode is set to a fifth opcode value,
wherein the opcode indicates that the timeslot carrying the data type transition indicator is the end of the BEP traffic when the opcode is set to a sixth opcode value,
wherein the opcode is a continuity check when the opcode is set to a seventh opcode value, and
wherein the opcode indicates that the second data flow immediately following the timeslot carrying the data type transition indicator is the start of a multipart opcode when the opcode is set to an eighth opcode value.

9. The network component of claim 8, wherein the processor is further configured to identify the first data flow type and the second data flow type using a flow map, and wherein the transmitted first data flow, the data type transition indicator, and the second data flow are part of a universal service transport multiplexing (USTM) data stream.

10. The network component of claim 9, wherein the flow map comprises a flow number that specifies a flow in the USTM data stream and a parity bit for each allocated time slot in the USTM data stream within a time window, wherein the processor is further configured to update a corresponding entry of the flow state table if the state of flow has changed, and wherein the entry of the flow state table comprises a flow number that specifies the flow and a flow state that is updated to indicate the last state of the flow.

11. The network component of claim 8, wherein the second data flow does not contain an indication of the second data flow type, and wherein the data type transition indicator is the only indication transmitted by the processor that indicates the second data flow type.

12. The network component of claim 8, wherein the first data flow, the data type transition indicator, and the second data type are transmitted using a plurality of 64-bit data blocks, and wherein one of the 64-bit data blocks comprises some, but not all, of the first data flow, all of the data type transition indicator, and none of the second data flow.

13. The network component of claim 12, wherein the one 64-bit data block comprising the data type transition indicator further comprises a continuity check that is only one octet long.

14. The network component of claim 8, wherein the data type transition indicator is only one octet long.

15. A method comprising:
receiving a data stream comprising a plurality of timeslots comprising time-division multiplexing (TDM) traffic, Ethernet traffic, and a data type transition indicator that separates the TDM traffic from the Ethernet traffic, wherein the TDM traffic in the data stream always begins at the beginning of one of the timeslots, and wherein the Ethernet traffic in the data stream always begins at the beginning of one of the timeslots;
separating the TDM traffic and the Ethernet traffic using the data type transition indicator; and
switching the TDM traffic in a first switch and the Ethernet traffic in a second switch,
wherein the timeslot carrying the data type transition indicator comprises a signaling information and one of the TDM traffic and the Ethernet traffic,
wherein the TDM traffic or the Ethernet traffic precedes the signaling information,
wherein the data type transition indicator further comprises a location field that indicates a first octet in the timeslot that carries the signaling information,
wherein the opcode indicates that the timeslot carrying the data type transition indicator is idle when the opcode is set to a first opcode value,
wherein the opcode indicates that the timeslot carrying the data type transition indicator is the start of a universal service transport (UST) frame when the opcode is set to a second opcode value,
wherein the opcode indicates that the timeslot immediately following the timeslot carrying the data type transition indicator is the start of high performance flow (HPF) traffic when the opcode is set to a third opcode value,
wherein the opcode indicates that the timeslot carrying the data type transition indicator is the end of the HPF traffic when the opcode is set to a fourth opcode value,
wherein the opcode indicates that the timeslot immediately following the timeslot carrying the data type transition indicator is the start of best effort packet (BEP) traffic when the opcode is set to a fifth opcode value,
wherein the opcode indicates that the timeslot carrying the data type transition indicator is the end of the BEP traffic when the opcode is set to a sixth opcode value,
wherein the opcode is a continuity check when the opcode is set to a seventh opcode value, and
wherein the opcode indicates that the timeslot immediately following the timeslot carrying the data type transition indicator is the start of a multipart opcode when the opcode is set to an eighth opcode value.

16. The method of claim 15, wherein the data type transition indicator comprises a continuity check that is only one octet long.

17. The method of claim 15, wherein each timeslot comprises only one data block, wherein each data block comprises a plurality of synchronization bits and a plurality of data octets associated with the synchronization bits, wherein the synchronization bits indicate that the associated data octets do not comprise the data type transition indicator when the synchronization bits are set to first value, and wherein the synchronization bits indicate that the associated data octets comprise the data type transition indicator when the synchronization bits are set to second value.

18. The method of claim 15, wherein each data type transition indicator further comprises:
the opcode that indicates a type of transition; and
a continuation field,
wherein the continuation field indicates that the timeslot immediately following the timeslot carrying the data type transition indicator carries additional signaling information, but not any of the TDM data or the Ethernet data when the continuation field is set to a first continuation field value, and
wherein the continuation field indicates that the timeslot immediately following the timeslot carrying the data type transition indicator carries the TDM data or the Ethernet data, but not any of the additional signaling information when the continuation field is set to a second continuation field value.

* * * * *